(12) United States Patent
Jibbe et al.

(10) Patent No.: US 8,762,730 B2
(45) Date of Patent: Jun. 24, 2014

(54) SYSTEM AND METHOD TO ESTABLISH AND/OR MANAGE A TRUSTED RELATIONSHIP BETWEEN A HOST TO STORAGE ARRAY CONTROLLER AND/OR A STORAGE ARRAY TO STORAGE ARRAY CONTROLLER

(75) Inventors: Mahmoud K. Jibbe, Wichita, KS (US); Senthil Kannan, Pondicherry (IN); Arunkumar Ragendran, Bangalore (IN); Britto Rossario, Bangalore (IN)

(73) Assignee: LSI Corporation, San Jose, CA (US)

( * ) Notice: Subject to any disclaimer, the term of this patent is extended or adjusted under 35 U.S.C. 154(b) by 125 days.

(21) Appl. No.: 13/085,777

(22) Filed: Apr. 13, 2011

(65) Prior Publication Data

US 2012/0265994 A1  Oct. 18, 2012

(51) Int. Cl.
*H04L 9/32* (2006.01)
*G06F 7/04* (2006.01)

(52) U.S. Cl.
USPC ............... 713/176; 713/155; 713/168; 726/4; 726/5

(58) Field of Classification Search
USPC ................. 713/179, 155, 168, 176; 726/4, 5
See application file for complete search history.

(56) References Cited

U.S. PATENT DOCUMENTS

| | | | |
|---|---|---|---|
| 6,845,387 B1 | 1/2005 | Prestas | 709/203 |
| 7,593,413 B2 | 9/2009 | Raisch | 370/401 |
| 2006/0248082 A1 | 11/2006 | Raikar et al. | 707/9 |
| 2006/0291422 A1* | 12/2006 | Rochford | 370/331 |
| 2010/0095360 A1* | 4/2010 | Pavlovski et al. | 726/7 |
| 2010/0325438 A1* | 12/2010 | Buer | 713/175 |
| 2012/0201232 A1* | 8/2012 | Velusamy et al. | 370/338 |
| 2012/0233449 A1* | 9/2012 | Thibadeau et al. | 713/2 |

* cited by examiner

*Primary Examiner* — Aravind Moorthy
(74) *Attorney, Agent, or Firm* — Christopher P. Maiorana, PC

(57) ABSTRACT

A method for establishing a secure connection between a first computer and a second computer, comprising the steps of (A) generating a signature authentication pair on the first computer, (B) receiving a plurality of authentication pairs that may or may not include the signature authentication pair, (C) detecting whether the signature authentication pair is received in the authentication pairs and (D) if the signature authentication pair is detected, creating a secure connection between the first computer and the second computer.

16 Claims, 4 Drawing Sheets

REGISTRATION DATA FLOW

LOGIN DATA FLOW

SYSTEM AND METHOD TO ESTABLISH AND/OR MANAGE A TRUSTED RELATIONSHIP BETWEEN A HOST TO STORAGE ARRAY CONTROLLER AND/OR A STORAGE ARRAY TO STORAGE ARRAY CONTROLLER

FIELD OF THE INVENTION

The present invention relates to storage devices generally and, more particularly, to a method and/or apparatus to establish and/or manage a trusted relationship between a host to storage array controller and/or a storage array to storage array controller.

BACKGROUND OF THE INVENTION

Conventional storage systems have a directly coupled relationship between the various Storage Area Network (SAN) entities. A SAN initiator can be a host trying to access a storage subsystem. A target storage array subsystem device and an intermittent switch are other types of SAN utilities. Typical SAN identity attributes such as a node World Wide Name (WWN) and a port WWN are hardcoded onto these entities and are difficult, if not impossible, to be imitated.

Other conventional systems are implemented in form of virtual entities. Identity attributes are flexibly applied and re-applied to such entities. Such approaches bring a greater need for end-to-end trusted relationship between an initiator and a target in a SAN.

Some of the common attacks on a Fibre Channel Protocol (FCP) based SAN include (i) node name or port name spoofing during a port login, (ii) source port ID spoofing on dataless FCP commands, and (iii) denial of service attacks made in user mode. A typical fibre channel SAN defines a handshake mechanism using challenge phrases to perform protected communication to protect data in transit. Such a handshake mechanism is not immune to identity attacks and/or brute force attacks. A node with an imitated identity could still login into a target and perform service denials or protocol congestion even if the node is unable to exchange data.

Other conventional approaches implement virtual machines in a SAN configuration. A server farm implemented using Virtual Machines (VMs) can log into a SAN fabric. In a virtual machine environment, the VM would be running with virtual Host Bus Adapter (HBAS) applied with a virtual WWN using the configuration files. If the VM configuration database is compromised, a VM could re-login with a stolen identity of a different VM and still obey the fabric rules (i.e., soft zoning, hard zoning, etc.) while gaining access to the target device. In a worst case scenario, a clone of a VM could re-login to the fabric using the VM clone with duplicate identities. This is highly difficult to achieve in a physical environment, since cloning the physical HBAs to imitate the WWN of a different host would be needed.

Other conventional approaches use a blade server behind a Fabric Module. A conventional blade server environment uses a Fibre Channel (FC) fabric module that routes traffic between multiple blade servers and the SAN fabric through a high speed uplink. The fabric module also applies shared connection profiles to the blades (i.e., MAC addresses, WWNs, etc.) that overrides the original settings of the servers. This is done mostly to achieve blade server failover. When a server is brought down, a different blade server takes over the application load and gains control of the underlying data across the SAN using the common connection profiles. With the blade server managed across the networks, hacking into the configuration database to create erroneous mappings of the connection profiles to the blade servers is made easier. The SAN fabric could allow routing based on the WWNs and the target could allow the login process though ultimately the target is communicating with the wrong host.

It would be desirable to implement a system and method to establish and/or manage a trusted relationship between a host to storage array controller and/or a storage array to storage array controller.

SUMMARY OF THE INVENTION

The present invention concerns a method for establishing a secure connection between a first computer and a second computer, comprising the steps of (A) generating a signature authentication pair on the first computer, (B) receiving a plurality of authentication pairs that may or may not include the signature authentication pair, (C) detecting whether the signature authentication pair is received in the authentication pairs and (D) if the signature authentication pair is detected, creating a secure connection between the first computer and the second computer.

The objects, features and advantages of the present invention include providing a storage system that may (i) be implemented without significant hardware changes at a host server and/or target, (ii) provide a trusted platform module (e.g., TPM) engine that may be implemented in the host server, (iii) provide a software layer that may be distributed across the host, TPM server and/or target array for coherent operation, (iv) implement an automated notification of an identity check failure to storage manager software, and/or (v) provide a system that is easy to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns enterprise storage area network (e.g., SAN) configurations. Enterprise SAN configurations have evolved in response to changing specifications of enterprise users. Many SAN configurations are adopting more flexible configurations and tend to be dominated by virtual entities and/or change ready scenarios.

The present invention may operate with a storage target. A SAN host or a storage array (acting as initiator) may establish a trusted identity for such initiators on the target that may be implemented in addition to a world wide web name (e.g., WWN) based login and/or authentication. The target storage array subsystem may (i) manage the identity download, (ii) provide an identity verification process on the host or another remote target (acting as initiator), (iii) login into the target and/or (iv) validate an identity before allowing further connections to be established.

The present invention may provide an identity initiator authentication pair, where a host and/or a storage array subsystem acts as the initiator. A WWN and/or a trusted platform module (e.g., TPM) signature may present a port login (e.g., PLOGI) initiator to the target. A TPM signature may provide information about various hardware to a server. The information may contain unique attributes created and stored by a TPM chip on one or more servers. The information may be in cryptographic form and/or may adhere to one or more TPM standards.

Figure 1:
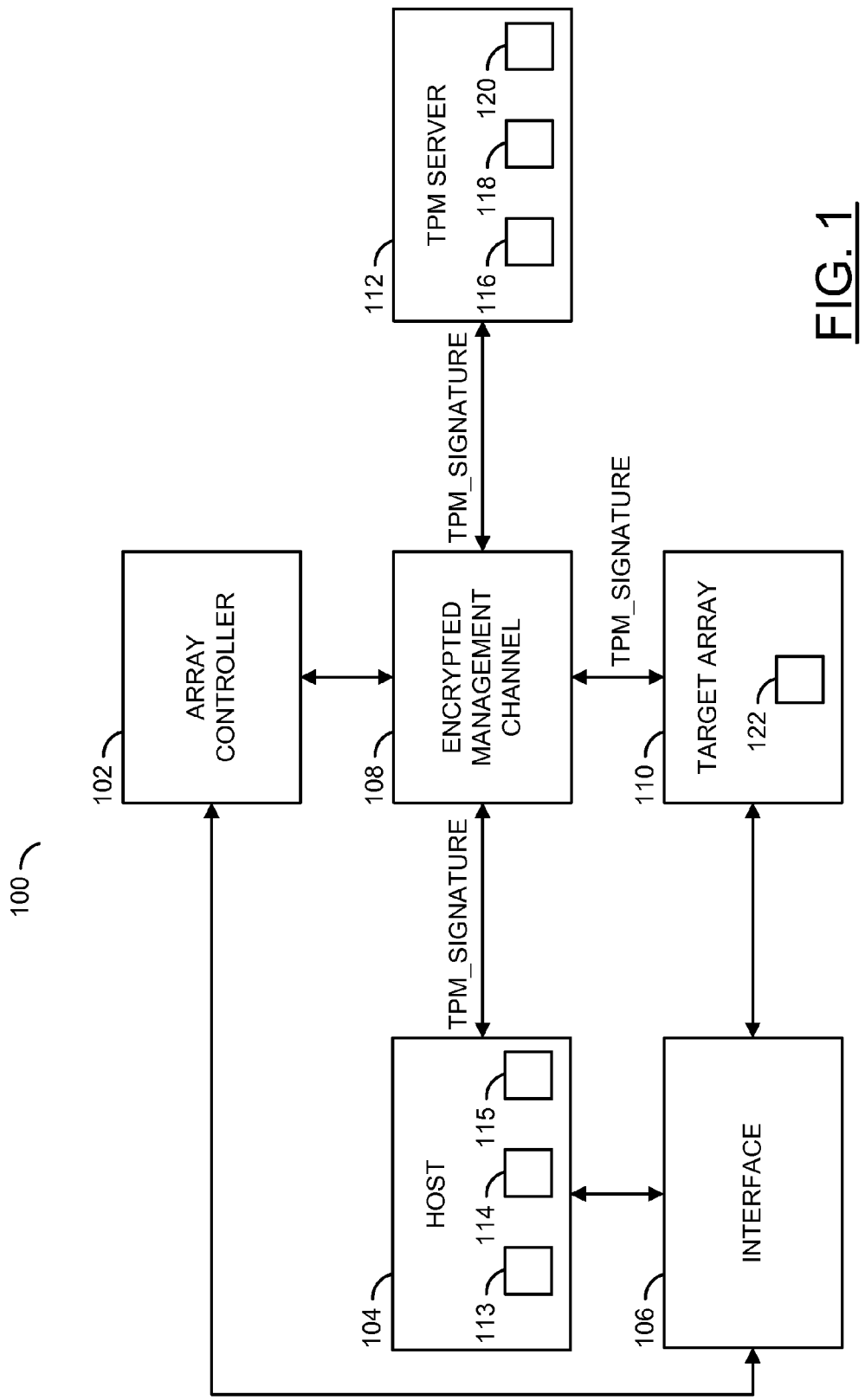
FIG. 1 is a block diagram illustrating the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, a block (or circuit) 108, a block (or circuit) 110, and a block (or circuit) 112. The circuit 102 may be implemented as an array controller. The circuit 104 may be implemented as one or more host servers (e.g., one or more storage arrays, one or more SAN hosts, etc.). The circuit 106 may be implemented as an interface. The circuit 108 may be implemented as an encrypted management channel. The circuit 110 may be implemented as a target array. The circuit 112 may be implemented as a TPM server.

The circuit 104 may have an input/output that may receive/present a signal (e.g., TPM_SIGNATURE) from/to the circuit 108. The signal may be implemented as a signature authentication pair. The circuit 108 may have an input/output that may receive/present the signal TPM_SIGNATURE from/to the circuit 104, an input/output that may receive/present the signal TPM_SIGNATURE from/to the circuit 110 and an input/output that may present the signal TPM_SIGNATURE to/from the circuit 112. The circuit 110 may have an input/output that may receive/present the signal TPM_SIGNATURE from/to the circuit 108. The circuit 112 may have an input that may receive the signal TPM_SIGNATURE from the circuit 108.

In one example, the host 104 may be implemented as a subsystem acting as initiator. The host 104 may include a block (or circuit) 113, a register 114, and a block (or circuit) 115. The block 113 may be implemented as a firmware module. The register 114 may be implemented as a TPM register. The register 114 may generate the signal TPM_SIGNATURE. The block 115 may be implemented as a TPM engine. The TPM engine 115 may be implemented as hardware, software, or a combination of hardware and/or software. The block 115 may be implemented as a software layer that may be configured to collect and/or upload the cryptic information. The storage array 104 may also update the signal TPM_SIGNATURE. The circuit 110 may comprise a block (or circuit) 122. The block 122 may monitor the TPM engine 115 to update the TPM information and/or subsequently exchange with the TPM server 112.

The server 112 may include a number of modules 116, 118 and 120. The modules 116, 118 and/or 120 may be implemented as hardware, software, or a combination hardware and/or software. One module 116 may store the signal TPM_SIGNATURE. The module 116 may run on the TPM server 112 to monitor incoming requests from the SAN host 104 and/or to store the signal TPM_SIGNATURE, and/or WWNs from the SAN host 104.

The server 112 may use the module 118 to generate a TPM-WWN key pair. The module 118 may generate an encoded key pair using the signal TPM_SIGNATURE of the server host 104 and/or WWNs. In one example, there may be multiple key pairs for a single server installed with multi-initiators.

The server 112 may use the module 120 to generate a forward TPM-WWN key pair. The module 120 may be configured to monitor incoming requests from the target array 110 and to forward the relevant key pairs requested. The module 120 may also reject requests without a key pair.

The storage array 110 may also include a module 122. The module 122 may generate a key pair. The module 122 may place requests to the TPM server 112 for the host 104 that may be requesting to receive a port login (PLOGI). The PLOGI may represent a request by an initiator (e.g., the host 102). The module 122 may store and/or validate the signal TPM_SIGNATURE.

The module 122 may include a non-volatile memory portion to store the received key pair during a first time registration of the host 104. If the host 104 is pre-registered, the module 122 may perform a matching comparison of the received key pair from the TPM server 112 to the previously stored signal TPM_SIGNATURE.

The module 122 may present a number of notifications. The module 122 may send relevant triggers to the administration interface that may provide notification if the host identity is not approved and/or if the host 104 needs re-registration onto the target array 110.

Figure 2:
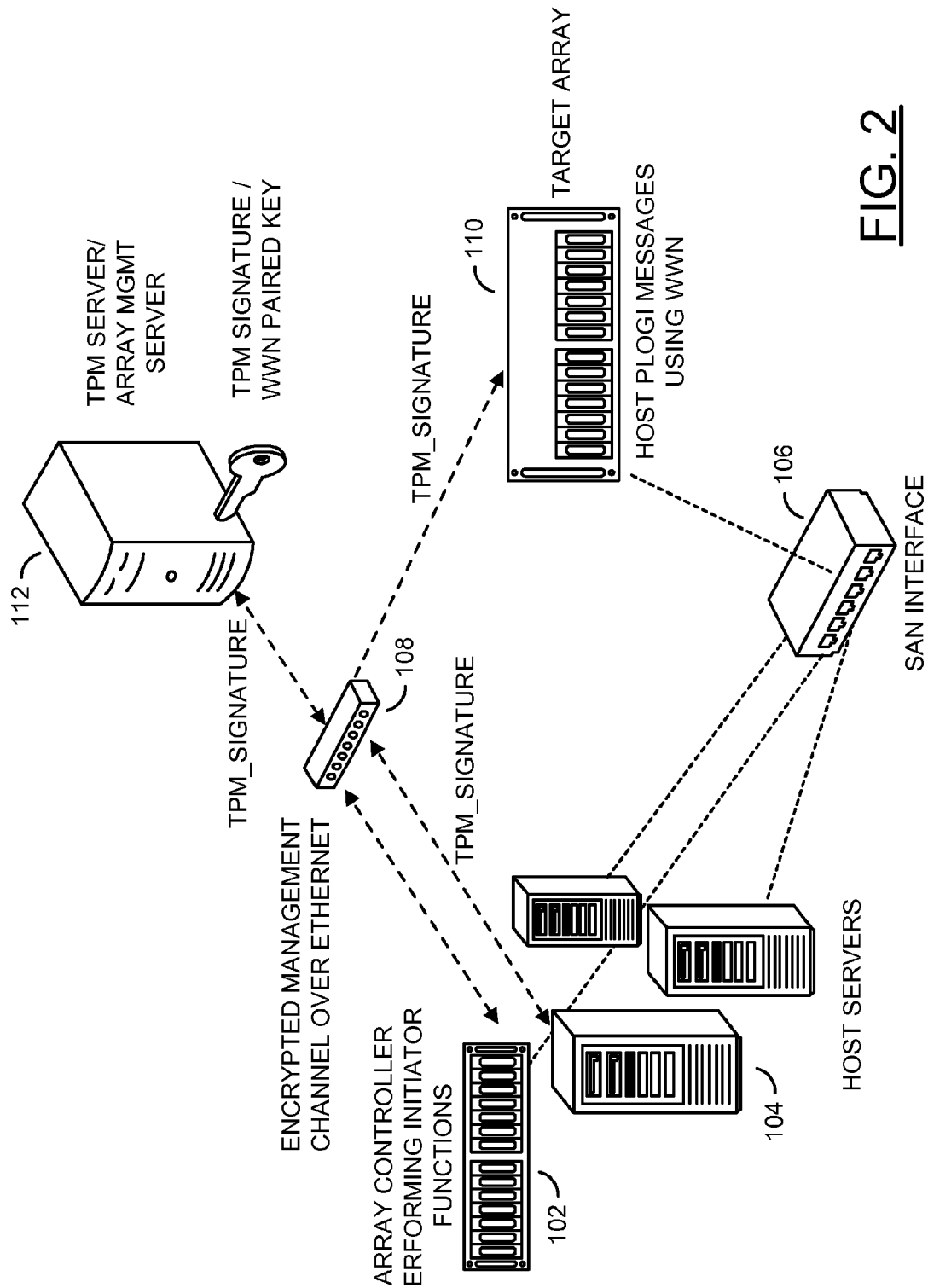
FIG. 2 is a block diagram illustrating a context of the present invention.

Referring to FIG. 2, a diagram illustrating a context of the present invention is shown in graphical form. The array controller 102 is shown graphically as a number of cards in an enclosure. The host 104 is shown graphically implemented as a number of host servers. The interface 106 is shown implemented as a SAN interface with a number of connection jacks. The block 108 is shown as a an encrypted management channel. The target array 110 is shown implemented as a number of devices in a rack type enclosure. The TPM server 112 is shown graphically as receiving a queue. The graphical representations shown in FIG. 2 are for illustrative purposes only.

A target PLOGI hold state may be defined until the target 110 verifies the identity of the initiator. The initiator signal TPM_SIGNATURE may be exchanged across an out of band management interface between the target 110 and the management server 112 (e.g., TPM server 112). Information (e.g., the signal TPM_SIGNATURE) exchanged between the target 110 and the management server 112 may be encrypted.

The target array 110 may perform identity verification of the initiator 104. The target array 110 may also store the signal TPM_SIGNATURE in a memory over multiple power cycles. A notification may be presented to a SAN administrator when a mismatched initiator PLOGI/first time PLOGI is presented to the target 104. A change mechanism may approve and/or accommodate the changes to the signal TPM_SIGNATURE and re-register the identity when there is a hardware change at the initiator resulting in compromise of identity.

A server host/initiator 104 (e.g., a physical or virtual machine on a physical host) may be installed with a TPM signature (e.g., the signal TPM_SIGNATURE). The signal TPM_SIGNATURE may store the configuration details of the server in a cryptographic form. In one example, the signal TPM_SIGNATURE may be defined according to TPM industry standards. Such cryptographic information defines the signal TPM_SIGNATURE. In a case where the storage subsystem array acts as initiator, a module within the controller firmware may be configured to the above activities.

The circuit 115 on server host 104 may register the signal TPM_SIGNATURE and/or host WWNs to the TPM signature server 112. In one example, the circuit 115 may be implemented as a software layer. The server 112 may also be connected to the storage array 110 through a management interface 108. The TPM server 112 may create an encoded key pair using the initiator WWN and the signal TPM_SIGNATURE.

Whenever the initiator computer 104 completes a fabric login (and subsequently a PLOGI into the target 110 for the very first time), the target 110 may fetch the key pair and store the signal TPM_SIGNATURE into a non-volatile memory 122. This may be implemented as a first time registration process of the initiator 104 as a trusted entity when the initiator 104 completes the PLOGI process and/or issues subsequent input/output requests to a Logical Unit Number (LUN) on the target 110. If the target storage array subsystem 110 is unable to find any matches to the signal TPM_SIGNATURE from the server 112 during the registration process, the target array 110 may notify an administrator using a management layer.

Figure 3A:
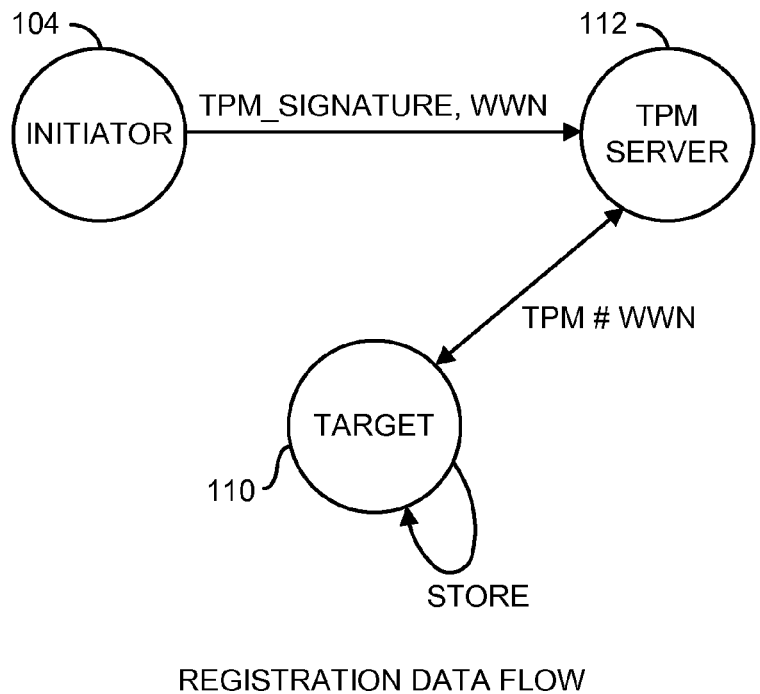
FIGS. 3A and 3B are data flow diagrams.
Figure 3B:
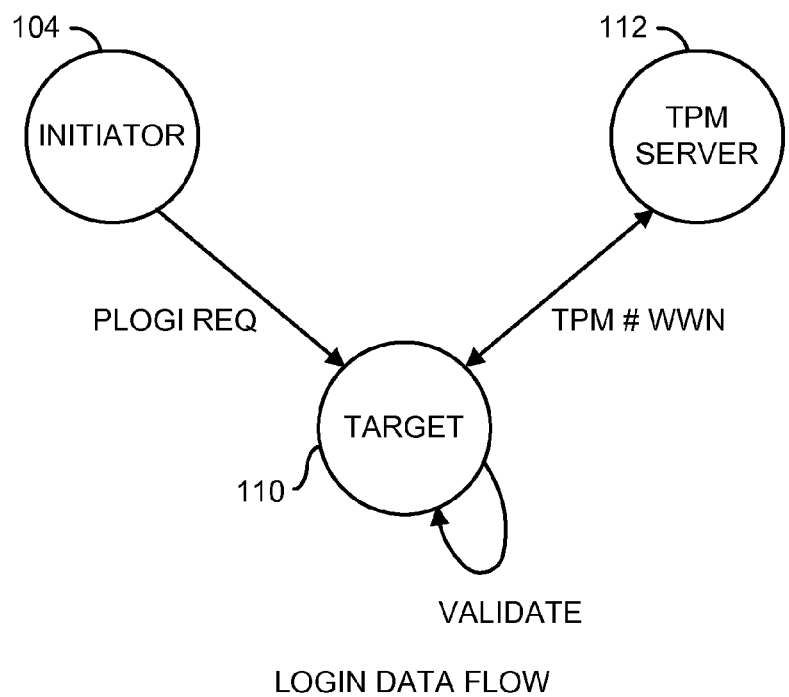

Referring to FIGS. 3A and 3B, data flow (or state) diagrams are shown. FIG. 3A describes the registration process and the data sets exchanged during the authentication process. The initiator 104 may exchange the signal TPM_SIGNATURE and/or the WWN paired value with the TPM server 112. The signal TPM_SIGNATURE may then be sent to the target 110 for persistent storage and/or lookup. FIG. 3B describes the login data flow when an initiator 104 sends a request PLOGI. The target 110 may validate the request with the already stored persistent TPM/WWN paired value to allow the trusted login. Once the login is validated and/or authenticated, the same key pair may be sent to the TPM server 112 to store the login details.

Subsequent connections from the initiator 104 may occur in response to an initiator power cycle, reboot, failure or the connection change in the fabric, and/or the controller going through a power cycle. The following steps may be taken to re-establish a connection. The initiator 104 may send a request PLOGI to the target 110 (e.g., the PLOGI response is held in a wait state). The target storage array 110 (e.g., using the WWN) may fetch the encoded signal TPM_SIGNATURE from the server 112. The target storage array 110 may then decode the encoded signal TPM_SIGNATURE to match the pre-registered signal TPM_SIGNATURE stored in non-volatile memory during registration. If a match is successful, the initiator 104 may complete the request PLOGI and approve the request for subsequent I/O transactions. If the key is unmatched, the target 104 may reject the PLOGI request and send out a notification to the storage administrator of the changed identity.

The time duration between PLOGI wait, fetch of the signal TPM_SIGNATURE and subsequent authentication/rejection may be designed to avoid multiple initiator timeouts. The actions taken by the SAN administrator during an identity match failure may be specific to a particular implementation.

The array management application may trigger a re-registration of the initiator 104 based on which particular target array 110 will fetch the changed/new signal TPM_SIGNATURE of the host server 104 from the TPM server 112 to store in the non-volatile memory. The initiator 104 may repeat the login process to the target array 110 when the previous request PLOGI has failed.

The system 100 may implement a SAN initiator authentication/detection method using the TPM module 115 installed in the host 104. The system 100 may also implement an agent management software 122 and/or the controller firmware module 113 to process registering the signal TPM_SIGNATURE.

Defining and/or establishing PLOGI wait/hold to contain initiator logins may be implemented in the target storage array subsystem layer 112. The initiator WWNs may be combined with other unique identification attributes of a server in an encoded form to perform SAN authentication. The trusted TPM signatures may be used for discovery and/or authentication to the storage array 110 by another storage array subsystem.

Multi-node cluster hosts 104 in active/active or active/passive configurations may implement for simultaneous access. The target 110 may preserve and authenticate multiple identities to the same set of logical unit numbers (e.g., LUNs). The storage target 110 may be connected to an always on TPM signature server 112. The host logins may be random in nature and may fetch the key pair when requested. The loss of key pairs in non-volatile memory may result in a refusal of connection to pre-approved hosts. Every host 104 may the be re-registered into the array 110.

The system 100 may implement large scale virtual server farms directly logged into SAN using NPIV (N port ID virtualization) or bladed servers behind a flex fabric topology. The system 100 may also implement remote mirroring capabilities between a source array 104 (acting as an initiator) and the target array 110. The system 100 may integrate a TPM engine into the target array 110 that may perform initiator responsibilities during remote mirroring/remote volume operations.

Figure 4:
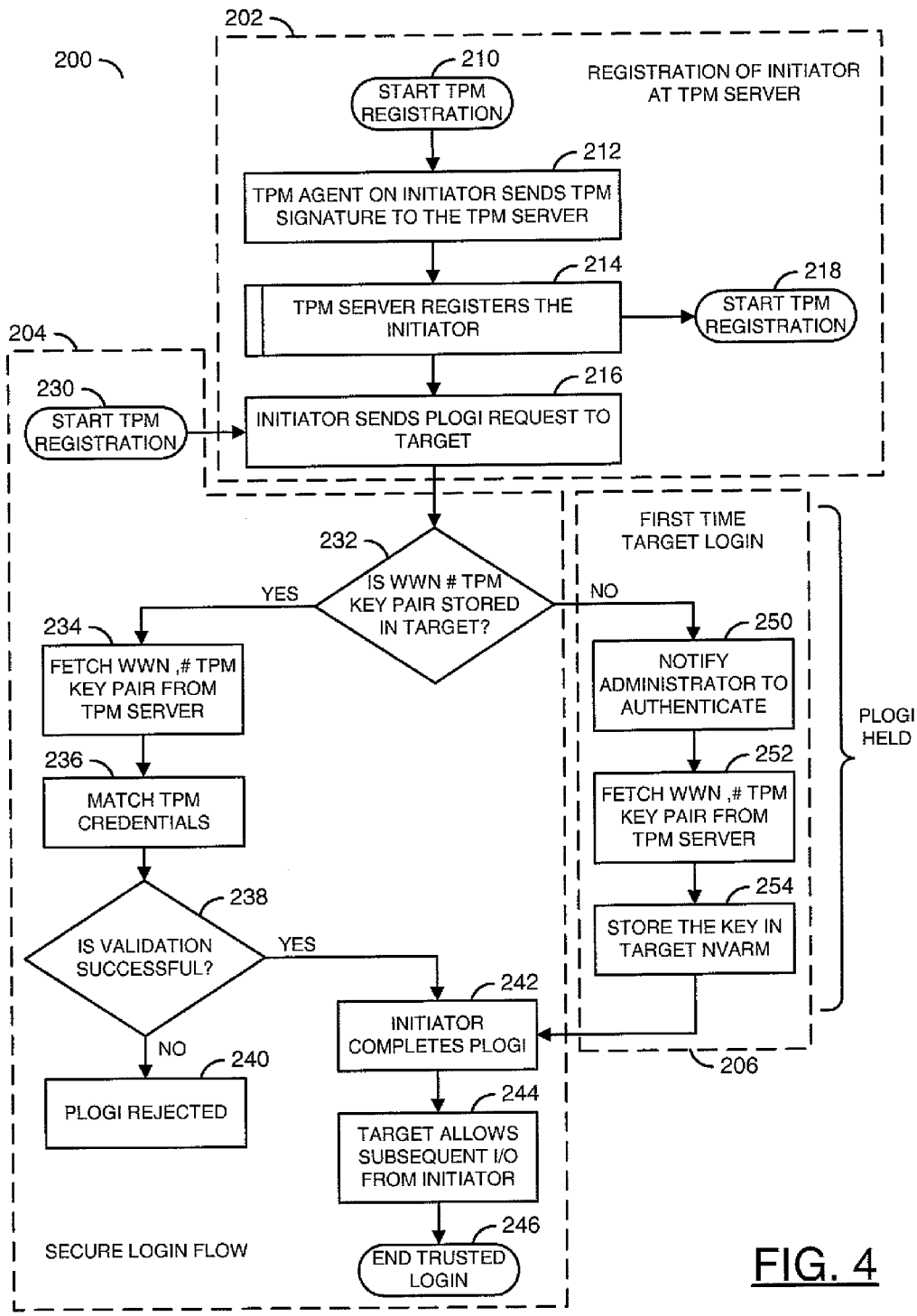
FIG. 4 is a flow diagram of the present invention.

Referring to FIG. 4, a diagram of a method (or process) 200 is shown. The method 200 generally comprises a step 202, a step (or state) 204 and a step (or state) 206. The step 202 may comprise a step (or state) 210, a step (or state) 212, a step (or state) 214, a step (or state) 216, and a step (or state) 218. The step 210 may be implemented as the start TPM registration state. The step 212 may implement a TPM agent on an initiator 104 which may send a TPM signature to the TPM server 112. The step 214 may implement a TPM server 112 which may register the initiator 104. The step 216 may implement an initiator 104 which may send a PLOGI request to the target 110.

The step 204 may include a step (or state) 230, a decision step (or state) 232, a step (or state) 234, a step (or state) 236, a decision step (or state) 238, a step (or state) 240, a step (or state) 242, a step (or state) 244, and a step (or state) 246. The step 230 may start a TPM registration process. The decision state 232 may determine wether a WWN number is a key pair stored in the target 110. If not, the method 200 moves to the step 206. If so, the method moves to the step 234. The step 234 may fetch the WWN from a number of TPM key pairs from the TPM server 112. Next, the state 236 may match the TPM credentials. Next, the decision state 238 may determine if the validation was successful. If not, the request PLOGI is rejected. If so, the method 200 moves to the state 242. The state 242 may implement an initiator complete PLOGI. Next, the method 200 moves to the state 244. The state 244 may implement the target 110 to allow a subsequent I/O from the initiator 104. Next, the method 200 moves to the state 244. The state 244 may end the trusted login.

The step 206 generally comprises a step (or state) 250, a step (or state) 252, and a step (or state) 254. The step 250 may notify an administrator to authenticate. Next, the step 252 may fetch a WWN number key pair from the server. Next, the step 254 may store the key in the target memory. Next, the method 200 moves to the state 242.

The system 100 may provide a storage system that may be implemented without any significant hardware changes at the host server 104 or target 110. Capabilities of the TPM engine may be implemented in the host 104. A software layer may be distributed across the host, TPM server 112 and/or target array 110 for coherent operation. Automated notification of identity check failure may be managed by the storage manager software. The system 100 may include a mechanism to detect multi-HBA installed servers and apply common TPM signature to the individual WWNs. The system 100 may provide individual identity checks for HBA ports from the server that is performing a request PLOGI into the target 110. Any potential changes in the server host 104 may be logged by the TPM engine 115. The TPM engine 115 may be monitored and updated across the network by the TPM server 112. The remote storage array discovery and/or remote mirroring may be processed through TPM based authentications. The system 100 may leave the host/remote initiator storage array subsystem authentication at the target storage array subsystem level provide a resilient SAN communication framework to address multiple ways to overcome the protection layers at a SAN fabric level.

The system 100 may be implemented without altering a typical and/or SAN login methodology or changing the SAN fabric rules. The system 100 may augment existing SAN fabric protection mechanisms. Even if the SAN configuration database is compromised and/or a malicious host works around the fabric rules by forging identities, the target array 110 may be equipped to refuse establishment of communication. The system 100 may only introduce minor overhead during the host registration cycle once the identity is established. The system 100 may implement I/O transfers without introducing overhead cycles. The system 100 may be equipped to handle/accommodate host level changes as the signal TPM_SIGNATURE is updated at every possible change. The TPM based identity mechanism may combine several unique attributes of a system into one unique identity. Enhanced security may be provided for remote LUN mirrors and/or data storage.

The system 100 may define a method and/or apparatus to establish identities that cannot be imitated to log into hosts/targets connected via a SAN. The system 100 may be used to provide remote mirroring configurations where a storage array to storage array communication/access is performed. The system 100 may be used to provide a SAN configuration where NPIV enabled hosts are logging into and/or perform access into target arrays. The system 100 may be used to provide a SAN configuration where a SAN host to target array login/access is performed for storage access.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for establishing a secure connection between a first computer and a target array, comprising the steps of:
   (A) generating a signature authentication pair on said first computer;
   (B) receiving a plurality of authentication pairs that may or may not include said signature authentication pair stored on a security computer;
   (C) validating an identity of said first computer by detecting whether said signature authentication pair is one of said authentication pairs stored on said security computer, wherein said validating of said identity occurs through a management channel; and
   (D) if said signature authentication pair is validated, creating said secure connection between said first computer and said target array to allow input/output requests from said first computer to be processed by said target array, wherein said secure connection is separate from said management channel.

2. The method according to claim 1, wherein said signature authentication pair comprises a TPM-WWN pair.

3. The method according to claim 2, further comprising the step:
   if said signature authentication pair is not detected, rejecting said TPM-WWN pair.

4. The method according to claim 1, wherein said signature authentication pair comprises information created and stored on one or more servers.

5. The method according to claim 1, wherein said plurality of authentication pairs are encoded using said signature authentication pair.

6. The method according to claim 1, wherein said security computer stores said signature authentication pair in a memory over multiple power cycles to increase security when storing said signature authentication pair.

7. The method according to claim 1, wherein said security computer performs a matching comparison of said authentication pairs to a previously stored signature authentication pair.

8. The method according to claim 1, wherein said validation of said signature authentication pair prevents imitation of a login identity.

9. An apparatus comprising:
   a host computer configured to request a secure connection to a target array; and
   a security server configured to (i) receive a plurality of authentication pairs from said host computer that may or may not include a signature authentication pair, (ii) validate an identity of said host computer by detecting whether said signature authentication pair is one of said authentication pairs, (iii) if said signature authentication pair is validated, creating said secure connection between said host computer and said target array to allow input/output requests from said host computer to be processed by said target array, (iv) said validation of said identity occurs through a management channel, and (v) said secure connection is separate from said management channel.

10. The apparatus according to claim 9, wherein said signature authentication pair comprises a TPM-WWN pair.

11. The apparatus according to claim 10, wherein said TPM-WWN pair is rejected if said signature authentication pair is not detected.

12. The apparatus according to claim 9, wherein said signature authentication pair comprises information created and stored on one or more servers.

13. The apparatus according to claim 9, wherein said plurality of authentication pairs are encoded using said signature authentication pair.

14. The apparatus according to claim 9, wherein said security server stores said signature authentication pair in a memory over multiple power cycles to increase security when storing said signature authentication pair.

15. The apparatus according to claim 9, wherein said security server performs a matching comparison of said authentication pairs to a previously stored signature authentication pair.

16. The apparatus according to claim 9, wherein said detection of said signature authentication pair prevents imitation of a login identity.

* * * * *